US009715669B2

(12) United States Patent
Arunagiri et al.

(10) Patent No.: US 9,715,669 B2
(45) Date of Patent: Jul. 25, 2017

(54) MONITORING AND REPORTING PRODUCTIVITY IN ENTERPRISE ENVIRONMENT

(75) Inventors: Kumara Arunagiri, Bangalore (IN); Robert P. Bartholomew, Bangalore (IN); Guruprasad Gowda, Shankar Nagar (IN); Nitish Kumar, Bangalore (IN); Derek A. Reid, Tulsa, OK (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 12/767,920

(22) Filed: Apr. 27, 2010

(65) Prior Publication Data

US 2011/0264710 A1   Oct. 27, 2011

(51) Int. Cl.
*G06F 17/30* (2006.01)
*G06Q 10/06* (2012.01)
*G06F 15/16* (2006.01)

(52) U.S. Cl.
CPC ... *G06Q 10/0639* (2013.01); *G06F 17/30345* (2013.01); *G06Q 10/06395* (2013.01); *G06Q 10/06398* (2013.01)

(58) Field of Classification Search
CPC ................................................. G06Q 10/0639
USPC ....................................................... 707/805
See application file for complete search history.

(56) References Cited

U.S. PATENT DOCUMENTS

| 5,696,702 | A | 12/1997 | Skinner et al. |
| 6,058,163 | A * | 5/2000 | Pattison ................... G07C 1/10 379/133 |
| 6,647,400 | B1 * | 11/2003 | Moran ..................... H04L 63/12 |
| 6,898,597 | B1 | 5/2005 | Cook et al. |
| 7,028,301 | B2 | 4/2006 | Ding et al. |
| 7,848,947 | B1 * | 12/2010 | McGloin et al. ............ 705/7.42 |
| 8,688,486 | B2 * | 4/2014 | Griffin ................ H04M 3/5238 705/7.11 |
| 2003/0120670 | A1 * | 6/2003 | Nareddy ................ G06Q 30/02 |
| 2005/0086098 | A1 * | 4/2005 | Fulton et al. ................... 705/11 |
| 2005/0171810 | A1 | 8/2005 | Klein et al. |
| 2005/0171833 | A1 | 8/2005 | Jost et al. |

(Continued)

OTHER PUBLICATIONS

Real Time Manager Forum. [online]. 2 pages. [retrieved on Jul. 31, 2009]. Retrieved from the Internet: < URL: http://www.realtimemanager.net/forum.aspx>.

*Primary Examiner* — Brittany N Allen
(74) *Attorney, Agent, or Firm* — Schmeiser, Olsen & Watts, LLP; John Pivnichny

(57) ABSTRACT

A system and associated method for monitoring and reporting productivity in an enterprise environment. The enterprise environment has a server, a database, a client program and a web interface. The database stores transaction data and administration data. The transaction data stores records of time spent by an end user to perform a certain volume of work for a transaction. The administration data configures operations of the client program per transaction. The client program records a time log and provides an interface to upload a volume log of the transaction. The end user or an administrative user manages content of the database via web interface. The server processes a respective request for recording transaction time and volume log and subsequently generates a productivity report including efficiency, availability, and utilization values based on the transaction data in the database.

18 Claims, 12 Drawing Sheets

(56) References Cited

U.S. PATENT DOCUMENTS

| | | | |
|---|---|---|---|
| 2006/0184410 A1* | 8/2006 | Ramamurthy | G06Q 10/10 706/8 |
| 2006/0190433 A1 | 8/2006 | Chkodrov et al. | |
| 2006/0233349 A1* | 10/2006 | Cooper | H04M 3/5175 379/265.06 |
| 2007/0038490 A1 | 2/2007 | Joodi | |
| 2007/0208834 A1* | 9/2007 | Nanamura | G06F 9/46 709/220 |
| 2007/0276722 A1* | 11/2007 | Silvera et al. | 705/11 |
| 2007/0288443 A1 | 12/2007 | Sakurai et al. | |
| 2008/0276179 A1 | 11/2008 | Borenstein et al. | |
| 2009/0043646 A1 | 2/2009 | Pingali et al. | |
| 2009/0083759 A1 | 3/2009 | Keil et al. | |
| 2009/0171927 A1 | 7/2009 | Nesamoney et al. | |
| 2010/0293039 A1* | 11/2010 | Whitsitt et al. | 705/11 |

\* cited by examiner

```
L101:    <timelog agentid="123813">
L102:    <record       date="2010-02-09"     start="00:00:01"
         end="12:35:37"   timegroupid="849023"   clientid="849"
         comments=""    network="01"    CRUD="U"    modified="F"
         filename="" attached="F" />
L103:    <record       date="2010-02-09"     start="12:36:12"
         end="14:24:29"   timegroupid="849023"   clientid="849"
         comments=""    network="01"    CRUD="U"    modified="F"
         filename="" attached="F" />
L104:    <record       date="2010-02-09"     start="14:24:29"
         end="14:57:57"   timegroupid="OC991"    clientid="849"
         comments=""    network="01"    CRUD="U"    modified="F"
         filename="" attached="F" />
L105:    <record       date="2010-02-09"     start="14:57:57"
         end="15:39:05"   timegroupid="849023"   clientid="849"
         comments=""    network="01"    CRUD="U"    modified="F"
         filename="" attached="F" />
L106:    <record       date="2010-02-09"     start="15:39:05"
         end="16:22:03"   timegroupid="OC993"    clientid="849"
         comments=""    network="01"    CRUD="U"    modified="F"
         filename="" attached="F" />
L107:    <record       date="2010-02-09"     start="18:24:32"
         end="23:24:58"   timegroupid="OC995"    clientid="849"
         comments=""    network="01"    CRUD="U"    modified="F"
         filename="" attached="F" />
L108:    <record       date="2010-02-09"     start="18:31:25"
         end="18:42:25"   timegroupid="OC995"    clientid="849"
         comments=""    network="01"    CRUD="U"    modified="F"
         filename="" attached="F" />
L109:    <record       date="2010-02-10"     start="12:37:43"
         end="12:46:05"   timegroupid="849023"   clientid="849"
         comments=""    network="01"    CRUD="U"    modified="F"
         filename="" attached="F" />
L110:    <record       date="2010-02-10"     start="12:46:05"
         end="12:50:59"   timegroupid="OC991"    clientid="849"
         comments=""    network="01"    CRUD="U"    modified="F"
         filename="" attached="F" />
L111:    <record       date="2010-02-10"     start="12:50:59"
         end="13:22:41"   timegroupid="849023"   clientid="849"
         comments=""    network="01"    CRUD="C"    modified="T"
         filename="" attached="F" />
L112:    </timelog>
```

FIG. 6A

```
L201:   <volumelog agentid="123813">
L202:     <record  date="2010-02-08"  subactivityid="849010"
        volume="75" clientid="849" CRUD="U" modified="F" />
L203:     <record  date="2010-02-08"  subactivityid="849023"
        volume="50" clientid="849" CRUD="U" modified="F" />
L204:   </volumelog>
```

FIG. 6B

```
L301:   <timelog agentid="123813">
L302:     <record    date="2010-01-06"    start="11:28:21"
        end="23:04:21"   timegroupid="849023"   clientid="849"
        comments=""    network="01"    CRUD="C"    modified="T"
        filename="" attached="F" />
L303:     <record    date="2010-02-09"    start="16:22:03"
        end="18:24:32"   timegroupid="849023"   clientid="849"
        comments=""    network="01"    CRUD="C"    modified="T"
        filename="" attached="F" />
L304:     <record    date="2010-02-09"    start="16:26:09"
        end="18:31:25"   timegroupid="849023"   clientid="849"
        comments=""    network="01"    CRUD="C"    modified="T"
        filename="" attached="F" />
L305:   </timelog>
```

FIG. 6C

MONITORING AND REPORTING PRODUCTIVITY IN ENTERPRISE ENVIRONMENT

BACKGROUND OF THE INVENTION

The present invention discloses a system and associated method for monitoring and reporting business activities and productivity of users in an enterprise environment. In conventional productivity monitoring methods, time spent by the users performing the business activities on an application program of a local computer system and volume of work performed are not monitored or reported. Conventional productivity monitoring methods do not apply work standards or work schedules for the business activities to evaluate measured time and volume of the business activities on the local computer system in calculating productivity of the users. Because of limited functionalities, conventional productivity monitoring methods are not capable of accurately monitoring and reporting productivity of users in specific enterprise environment.

BRIEF SUMMARY

According to one embodiment of the present invention, a method for monitoring and reporting productivity in an enterprise environment comprises a processor of a server computer receiving a request to modify a database coupled to the server computer, wherein the database comprises transaction data and administration data, wherein the transaction data comprise a time log and a volume log of a transaction performed by an end user by use of a client program, wherein the administration data configures operations of the client program per transaction, and wherein productivity metric figures of the transaction are calculated based on a respective time spent (T), a respective work standard (S), and a respective time period (H) for each transaction; identifying a sender of the request, wherein the sender is selected from the group consisting of the client program and a web interface, wherein the web interface is configured to manage the database; processing the received request pursuant to a type of the received request, wherein the type is selected from the group consisting of a management request and a transaction request if the sender is the web interface, wherein the type is the transaction request if the sender is the client program; and generating at least one report comprising the productivity metric figures of the transaction from said processing and subsequently returning the generated at least one report to the sender from said identifying.

According to one embodiment of the present invention, a computer program product comprises a computer readable memory unit that embodies a computer readable program code. The computer readable program code contains instructions that, when run by a processor of a computer system, implement a method for monitoring and reporting productivity in an enterprise environment.

According to one embodiment of the present invention, a computer system comprises a processor and a computer readable memory unit coupled to the processor, wherein the computer readable memory unit containing instructions that, when run by the processor, implement a method for monitoring and reporting productivity in an enterprise environment.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for monitoring and reporting productivity in an enterprise environment.

BRIEF DESCRIPTION OF THE SEVERAL VIEWS OF THE DRAWINGS

FIG. 6A is an example of valid time log stored in the local computer system and transferred to the TVC server at step 260 of FIG. 2A, in accordance with the embodiments of the present invention.

FIG. 6B is an example of valid volume log stored in the local computer system and transferred to the TVC server at step 260 of FIG. 2A, in accordance with the embodiments of the present invention.

FIG. 6C is an example of invalid time log stored in the local computer system at step 270 of FIG. 2A, in accordance with the embodiments of the present invention.

DETAILED DESCRIPTION

Figure 1:
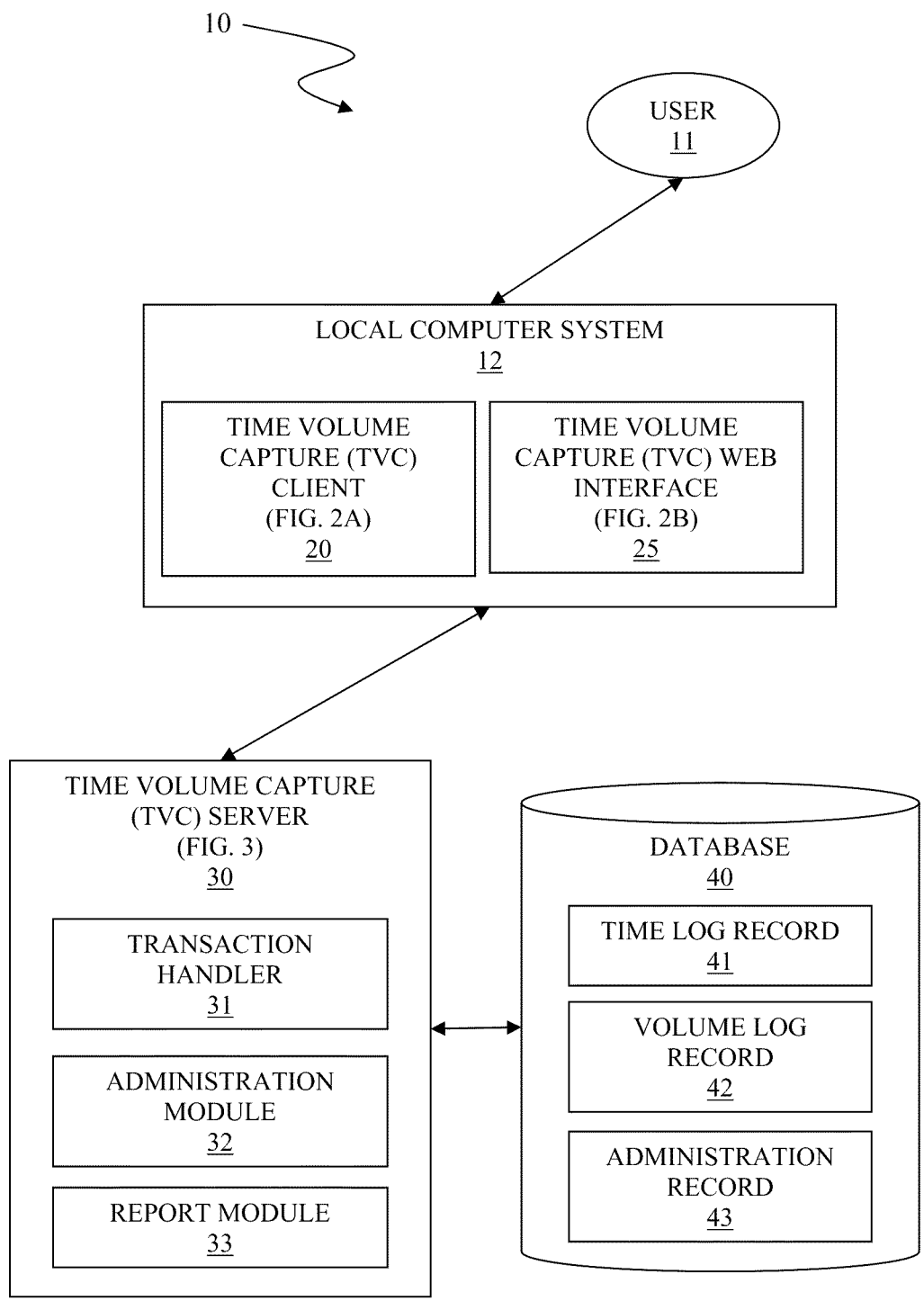
FIG. 1 illustrates a system for productivity monitoring in an enterprise environment, in accordance with embodiments of the present invention.

FIG. 1 illustrates a system 10 for monitoring productivity in an enterprise environment, in accordance with embodiments of the present invention.

The system 10 comprises a user 11, a local computer system 12, a Time Volume Capture (TVC) server 30, and a database 40. In this specification, the term "enterprise environment" is defined as any information technology (IT) environment that services business functionalities.

The local computer system 12 runs a Time Volume Capture (TVC) client 20 and a Time Volume Capture (TVC) web interface 25, through which the user 11 communicates with the TVC server 30.

The user 11 of the local computer system 12 accesses the TVC server 30 through the TVC client 20 or through the TVC web interface 25. The user 11 may be an end-user or an administrator. The end-user primarily participates in productivity monitoring by recording the transaction data with the TVC client 20 according to a configured work schedule, and has a limited administrative access in the TVC web interface 25. The administrator primarily manages the system 10 by using administrative functionalities of the TVC server 30, and records some transaction data in the database 40.

The TVC client 20 is a program running in the local computer system 12 of the user 11 to provide an interface to the TVC server 30 for the user 11 for productivity monitoring and reporting. The TVC client 20 enables the end-user to record time log and volume log of business activities performed by the end-user as the business activities are performed on the local computer system 12 to the database 40. The end-user records the time log by time stamping start and end time of each business activity with the TVC client 20. The end-user changes activities according to a work schedule of the end-user. The end-user records the volume log daily or periodically throughout the performance. The TVC client 20 enables the administrator to record the volume log of jobs performed by multiple end-users to the database 40. See descriptions of FIG. 2A infra for steps performed by the TVC client 20. See descriptions of FIGS. 5A, 5B, and 5C, infra, for an embodiment of the TVC client 20.

The TVC web interface 25 runs on the local computer system 12 to provide an administrative interface to the TVC server 30 for both the end-user and the administrator. Through the TVC web interface 25, the end-user modifies the transaction data that had been created by the end-user and account information related to the end-user. The administrator accesses additional productivity monitoring and reporting functionalities of the TVC server 30 and other external system or the local computer system 12 through the TVC web interface 25. In one embodiment, the TVC web interface 25 runs by use of a web browser of the local computer system 12. See descriptions of FIG. 2B infra for steps performed by the TVC web interface 25. See descriptions of FIG. 5D infra for an embodiment of the TVC web interface 25.

The TVC server 30 comprises a transaction handler 31, an administration module 32, and a report module 33. The TVC server 30 receives a TVC request from the user 11 through the TVC client 20 or through the TVC web interface 25, processes the received TVC request, and stores results of processing the TVC request into the database 40. See descriptions of FIG. 3 infra for steps performed by the TVC server 30.

The transaction handler 31 of the TVC server 30 processes any TVC request received via the TVC client 20 and TVC transaction requests received via the TVC web interface 25. See descriptions of FIG. 4A infra for steps performed by the transaction handler 31. The administration module 32 of the TVC server 30 processes TVC management requests received via the TVC web interface 25, either from the administrator or the end-user. See descriptions of FIG. 4B infra for steps performed by the administration module 32.

The report module 33 of the TVC server 30 generates and stores reports by calculating various productivity metrics of each specified activity according to the time log record 41 and the volume log record 42 stored in the database 40 from previously processed TVC transaction requests and TVC management requests. The various productivity metrics are calculated for each individual end-user, per business activity, per a department comprising multiple end-users, for all end-users entering transaction data, etc. The report module 33 conceptually represents a functionality of the TVC server 30 as step 440 of FIG. 3 infra.

The database 40 stores an administration record 43 and transaction data provided from the user 11 to the TVC server 30. The transaction data comprises a time log record 41 and a volume log record 42. The time log record 41 comprises a start time and a stop time as time-stamped to represent the amount of time the user 11 has spent on a particular business activity. The administration record 43 comprises user account data, taxonomy data, and configuration data.

In one embodiment of the present invention, the taxonomy data define terminology for activities used in the TVC client 20. The taxonomy data is created for a specific end-user account or for a specific business process. The taxonomy data is uploaded by the administrator and later deployed in the TVC client 20 for recording time logs and volume logs for productivity monitoring. In the same embodiment, the transaction data are validated over a predefined time period to adjust work standard of each specific business process. The predefined time period for validating the transaction data may be, inter alia, a day, a week, two weeks, a month, a quarter, etc, based on time required to complete one process cycle.

In the same embodiment of the present invention, the process taxonomy of the system 10 that configures the TVC client 20 is Activity and Timegroup, wherein Activity represents a high-level process and Timegroup represents a process component of an Activity. The Activity-Timegroup taxonomy is predefined and stored as administrative records 43 in the database 40 by the administrator and deployed in the TVC client 20. In this embodiment, the database 40 is hierarchically organized with Activities on a top level and Timegroups for each Activity. Time log records in the database 40 are generated for a Timegroup level to capture start and end time-stamps of work performed by the user 11. The user 11 selects both an Activity and a Timegroup grouped under the Activity in logging the time record by use of the TVC client 20. Volumes of work performed by the user 11 are recorded as a volume log record under the Timegroup level, along with the time log record for the Timegroup.

In the same embodiment of the present invention, productivity metrics produced by the report module 33 comprise an efficiency value (E), an availability value (A), and a utilization value (U), wherein each Timegroup activity is associated with a respective work standard that is defined as an expected amount of time to complete a unit of the respective activity (S). The efficiency value (E) is calculated as a percentage value of the time spent, stored as the time log record in the database (T), relative to the expected time to complete the activity specified in the work standard (S), that is $E=(T/S)\times 100$. The availability value (A) is calculated as a percentage value of the time spent (T), relative to the time period during which said end user is expected to be available to work on a transaction (H), that is $A=(T/H)\times 100$. The utilization value is calculated as a product of the efficiency value (E) and the availability value (A), that is U=E×A.

In the same embodiment of the present invention, each Timegroup activity specified in the system 10 has a predefined work driver. The calculated productivity metrics provide information on efficiency of each user per activity, availability of each user, and utilization of working hours of each user. The report module 33 also assesses efficiency of each activity and individual users by comparing the calculated productivity metrics with predefined activity work standards stored as administration records in the database for each activity.

In the same embodiment of the present invention, examples of the enterprise environment are, inter alia, finance and administration (F&A), human resources (HR), supply chain, customer relationship management (CRM), or business process areas, etc. The TVC client 20 is implemented by use of .NET™ technology and C Sharp programming language. The TVC server 30 is implemented by use of WebSphere® Application Server (WAS) and Java® programming language. (.NET is a trademark of Microsoft Corporation in the United States; WebSphere is a registered trademark of International Business Machines (IBM) Corporation in the United States; Java is a registered trademark of Sun Microsystems, Inc., in the United States)

Figure 2A:
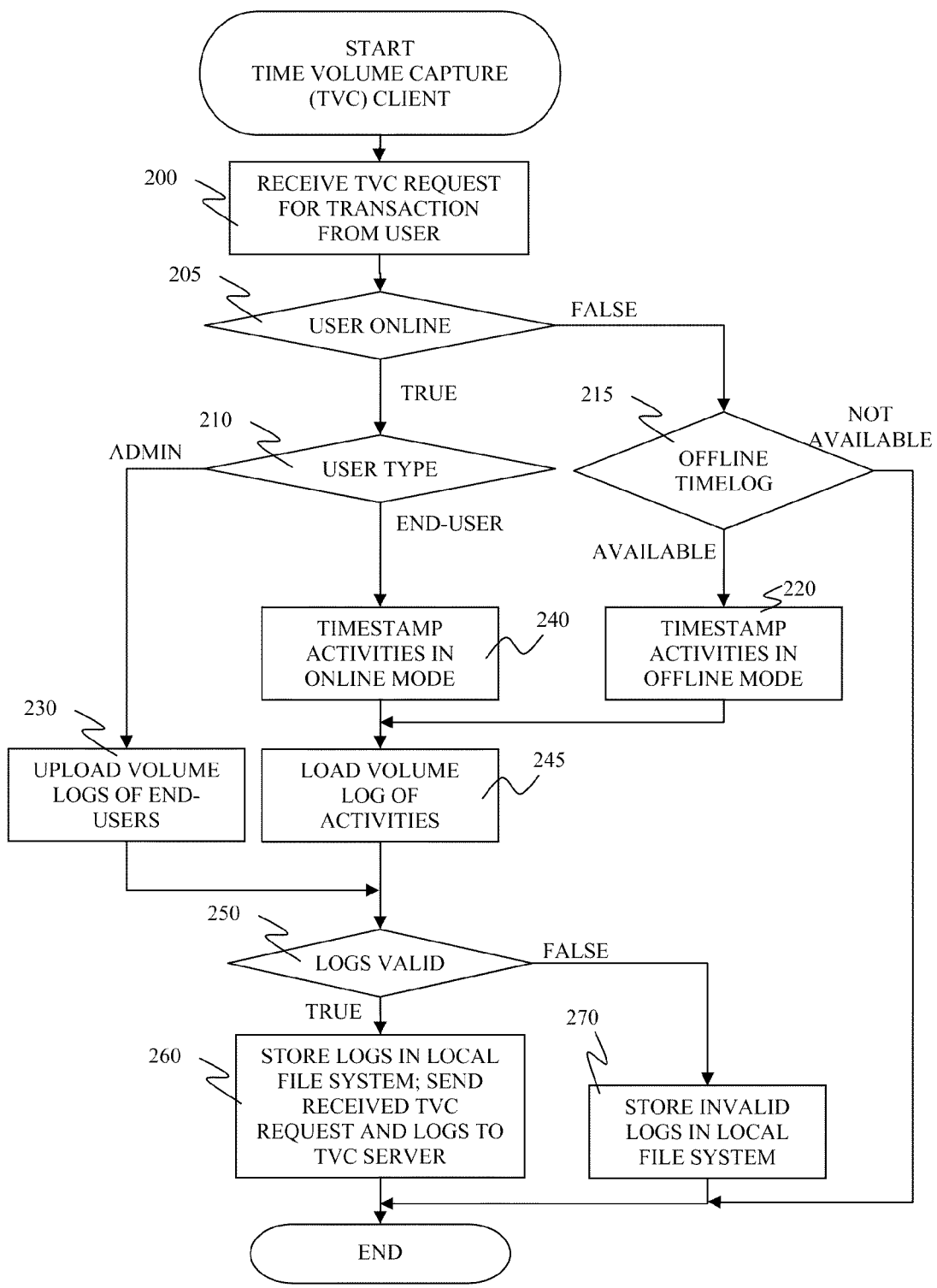
FIG. 2A is a flowchart depicting a method for monitoring and reporting productivity in an enterprise environment as performed by the Time Volume Capture (TVC) client of FIG. 1, in accordance with the embodiments of the present invention.

FIG. 2A is a flowchart depicting a method for monitoring and reporting productivity in an enterprise environment as performed by the Time Volume Capture (TVC) client of FIG. 1 supra, in accordance with the embodiments of the present invention.

In step 200, the TVC client receives a TVC request for a transaction from the user. The user may be an administrator or an end-user, who has been properly authenticated against account information associated with the user. The TVC request may be, inter alia, a request for recording transaction data from the end-user, a request for recording volume log from the administrator, etc. Then the TVC client proceeds with step 205.

In step 205, the TVC client determines whether the user sending the TVC request is on-line. If the TVC client determines that the user is on-line, then the TVC client proceeds with step 210. If the TVC client determines that the user is not on-line, then the TVC client proceeds with step 215.

In step 210, the TVC client determines whether the user is an administrator or an end-user. If the TVC client determines that the user is an administrator, then the TVC client proceeds with step 230. If the TVC client determines that the user is an end-user, then the TVC client proceeds with step 240.

In step 215, the TVC client determines whether the user determined as being off-line in step 205 have account information available in the local computer system such that the off-line user can report time log off-line. When a user uses the TVC client for the first time, the account information is registered in the local computer system. The user whose account information available in the local computer system is a returning user of the TVC client, and the TVC client permits recording of off-line time logs. In one embodiment of the present invention, the account information in the local computer system expires after a certain period of time, in a range of 24-48 hours, to secure the user authentication process.

If the TVC client determines that the off-line user can report time log in off-line mode, then the TVC client proceeds with step 220. If the TVC client determines that the off-line user does not have account information available in the local computer system and consequently cannot report time log in off-line mode, then the TVC client terminates.

In step 220, the TVC client timestamps activities performed by the user in off-line mode. Timestamps comprise a first time when the user starts performing the activity and a second time when the user completes performing the activity, including intermissions. Then the TVC client proceeds with step 245.

In step 230, the TVC client uploads volume logs of end-users as provided by the administrator as determined in step 210. The administrator does not actually perform activities and consequently does not create time logs. The administrator is capable of uploading the amount of work performed by a certain group of end-users as volume logs in a specified format for the purpose of management. In one embodiment of the present invention, the volume log is in a Microsoft® Office Excel® work sheet format. (Microsoft, Office, and Excel are registered trademarks of Microsoft Corporation in the United States) Then the TVC client proceeds with step 250.

In step 240, the TVC client timestamps activities performed by the end-user in on-line mode, as the user performs the activities defined in the TVC client on the local computer system. Then the TVC client proceeds with step 250.

In step 245, the TVC client loads the volume log of activities either time stamped off-line or on-line, in either step 220 or step 240, respectively. Then the TVC client proceeds with step 250.

In step 250, the TVC client determines whether the time logs and/or the volume logs that have been loaded in step 230 or step 245 are valid. The transaction data provided by the user is validated for formatting and other anomalies, to be submitted to the TVC server for further processing and recording into the database. In one embodiment of the present invention the transaction logs are stored in the Extensible Markup Language (XML) format.

If the TVC client determines that the loaded logs are valid, then the TVC client proceeds with step 260. If the TVC client determines that either the time logs or the volumes logs are not valid, then the TVC client proceeds with step 270.

In step 260, the TVC client stores the time logs and the volume logs in a local file system of the local computer system and subsequently sends the TVC request received in step 200 and the time logs and the volume logs to the TVC server. See FIGS. 6A and 6B, infra, and accompanying descriptions for examples of the time logs and the volume logs. Then the TVC client terminates.

In step 270, the TVC client stores the time logs and the volume logs in the local file system that have been determined as invalid in step 250. The TVC client does not transfer invalid logs to the TVC server. See FIG. 6C, infra, and accompanying descriptions for examples of invalid time logs. Then the TVC client terminates.

Figure 2B:
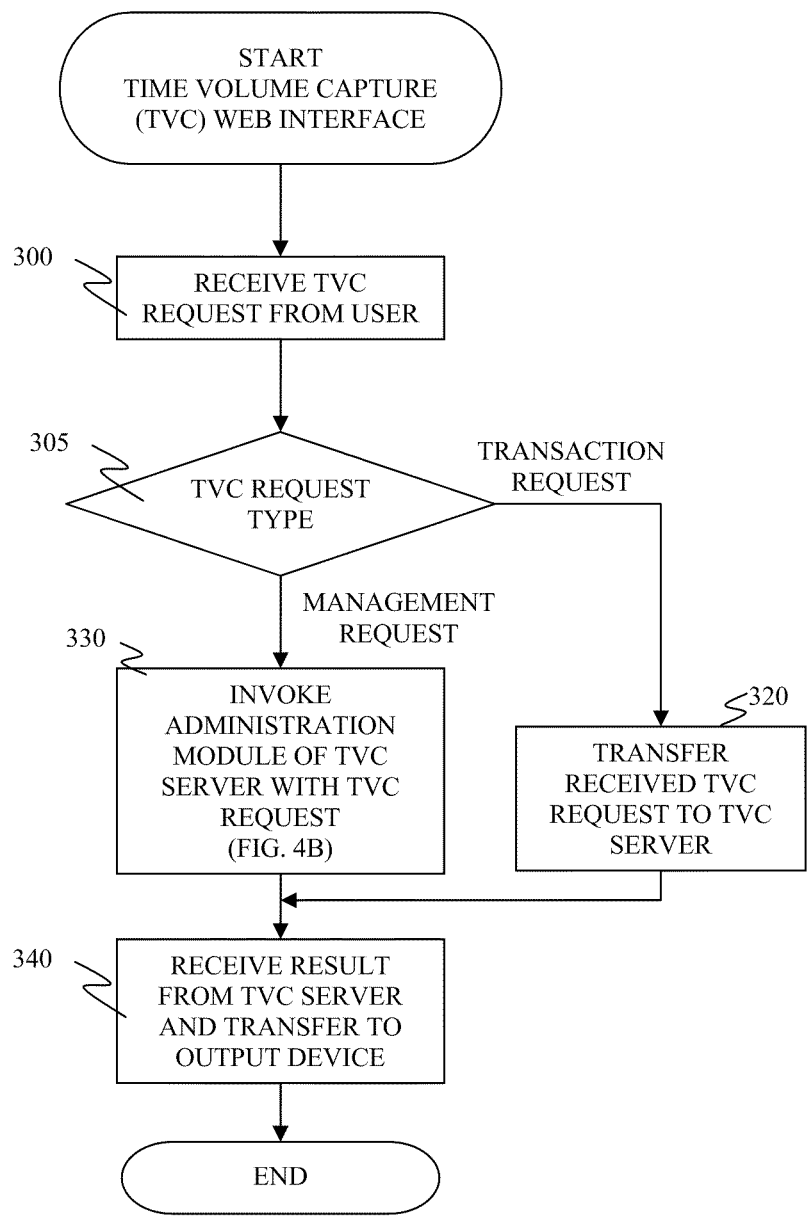
FIG. 2B is a flowchart depicting a method for monitoring and reporting productivity in an enterprise environment as performed by the Time Volume Capture (TVC) web interface of FIG. 1, in accordance with the embodiments of the present invention.

FIG. 2B is a flowchart depicting a method for monitoring and reporting productivity in an enterprise environment as performed by the Time Volume Capture (TVC) web interface of FIG. 1 supra, in accordance with the embodiments of the present invention.

In step 300, the TVC web interface receives a TVC request from the user. The TVC request may be a transaction request or a management request. Then the TVC web interface proceeds with step 305.

In step 310, the TVC web interface determines a type of the TVC request received in step 300. If the TVC web interface determines that the received TVC request is a transaction request, the TVC web interface proceeds with step 320. If the TVC web interface determines that the received TVC request is a management request, the TVC web interface proceeds with step 330.

In step 320, the TVC web interface transfers the received TVC request for a transaction to the TVC server for further processing. See FIG. 3 infra for steps of the TVC server taken in response to receiving the TVC request for a transaction. Then the TVC web interface proceeds with step 340.

In step 330, the TVC web interface invokes the administration module of the TVC server for the received TVC request for management. See FIG. 4B infra for steps of the administration module. Then the TVC web interface proceeds with step 340.

In step 340, the TVC web interface receives a result of processing the TVC request of step 300 from the TVC server and transfers the result to an output device of the local computer system. Then the TVC web interface terminates.

Figure 3:
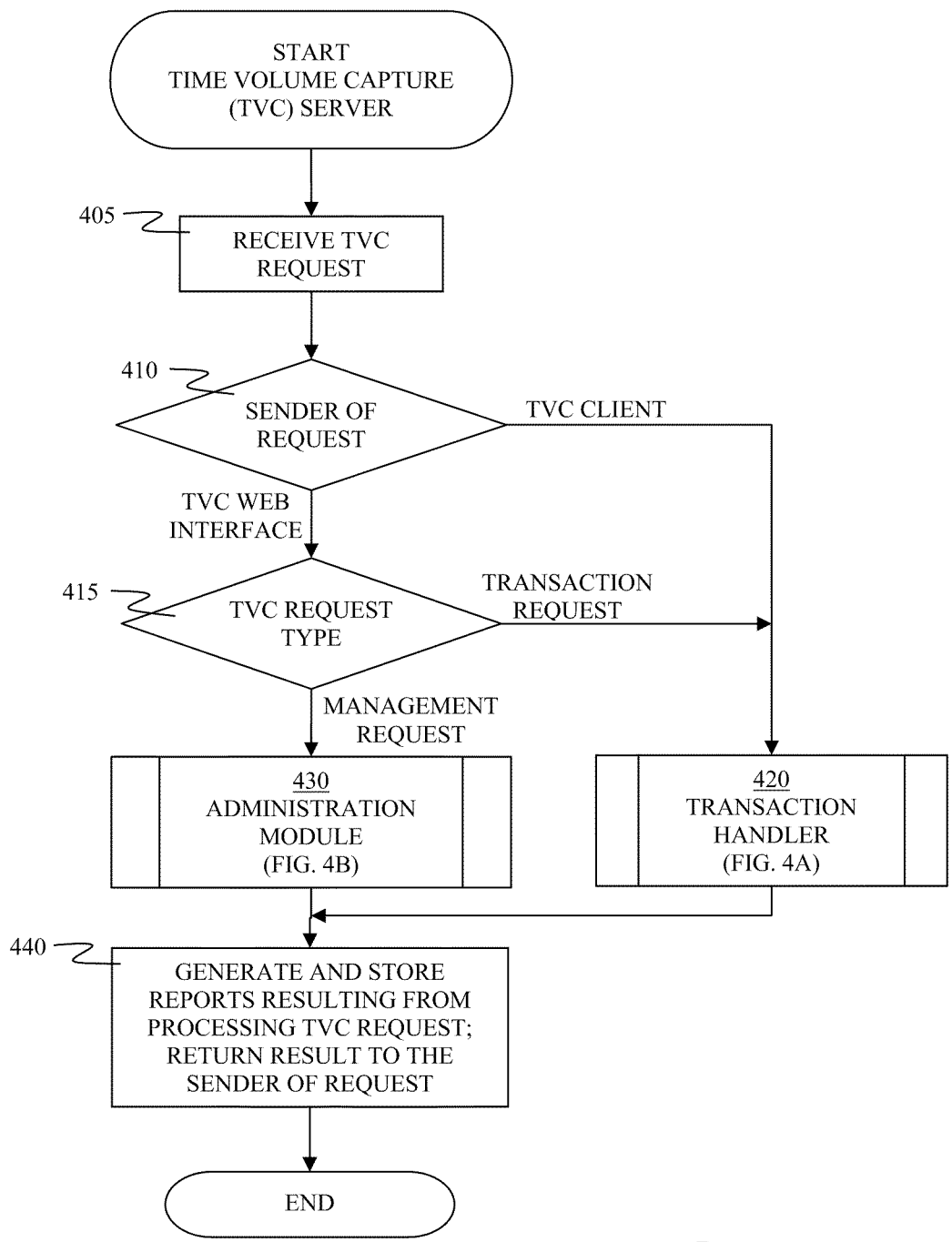
FIG. 3 is a flowchart depicting a method for monitoring and reporting productivity in an enterprise environment as performed by the Time Volume Capture (TVC) server of FIG. 1, in accordance with the embodiments of the present invention.

FIG. 3 is a flowchart depicting a method for monitoring and reporting productivity in an enterprise environment as performed by the Time Volume Capture (TVC) server of FIG. 1 supra, in accordance with the embodiments of the present invention.

In step 405, the TVC server receives the TVC request sent via the TVC client or via the TVC web interface. Then the TVC server proceeds with step 410.

In step 410, the TVC server determines a sender of the TVC request. If the TVC server determines that the TVC request is received from the TVC web interface, then the TVC server proceeds with step 415. If the TVC server determines that the TVC request is received from the TVC client, then the TVC server proceeds with step 420.

In step 415, the TVC server determines a type of the TVC request that has been received from the TVC web interface. If the TVC server determines that the TVC request is a transaction request, then the TVC server proceeds with step 420. If the TVC server determines that the TVC request is a management request, then the TVC server proceeds with step 430.

In step 420, the TVC server processes the TVC request for a transaction by performing the transaction handler of the TVC server. See FIG. 4A infra for steps of the transaction handler. Then the TVC server proceeds with step 440.

In step 430, the TVC server processes the TVC request for a management by performing the administration module of the TVC server. See FIG. 4B infra for steps of the administration module. Then the TVC server proceeds with step 440.

In step 440, the TVC server generates and stores, in the database, reports resulting from processing the TVC request, and subsequently transfers the result to the sender of the TVC request as determined in step 410. In step 440, the transaction handler and the administration module send calibrated data to the report module of the TVC server, and the report module subsequently processes the transaction data and administration data to create various types of reports. See descriptions of FIG. 5D infra, for examples of reports created by the report module. Then the TVC server terminates.

Figure 4A:
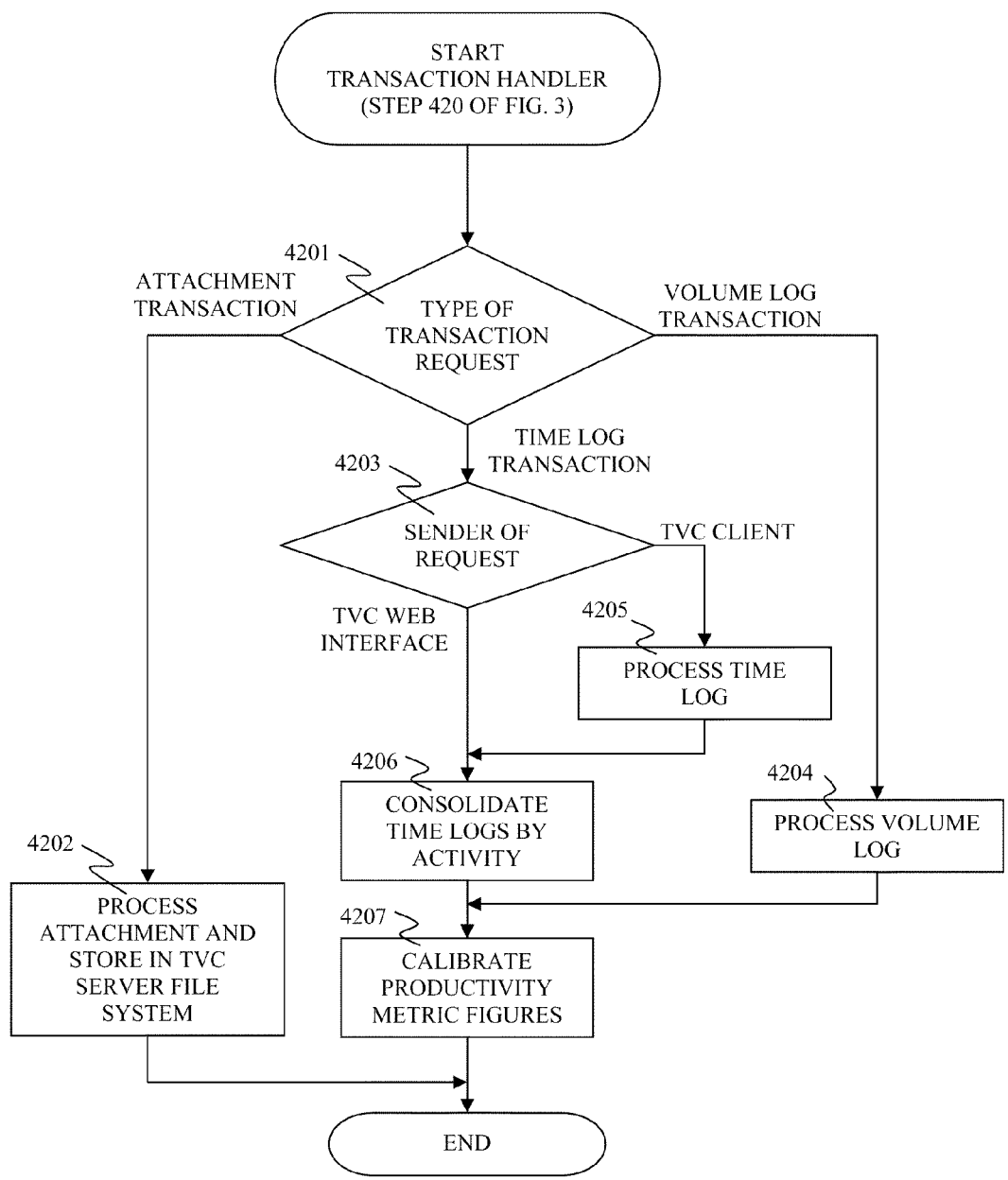
FIG. 4A is a flowchart depicting a method for handling transactions for the TVC server of FIG. 1 as performed by the transaction handler of the TVC server, in accordance with the embodiments of the present invention.

FIG. 4A is a flowchart depicting a method for handling transactions for the TVC server of FIG. 1 supra as performed by the transaction handler of the TVC server, in accordance with the embodiments of the present invention.

In step 4201, the transaction handler determines a type of the transaction request of step 415 of FIG. 3 supra. If the transaction handler determines that the type of the transaction request is an attachment transaction, then the transaction handler proceeds with step 4202. If the transaction handler determines that the type of the transaction request is a time log transaction, then the transaction handler proceeds with step 4203. If the transaction handler determines that the type of the transaction request is a volume log transaction, then the transaction handler proceeds with step 4204.

In step 4202, the transaction handler processes an attachment of the TVC transaction request and stores the attachment in the database of the TVC server for later retrieval by the user. In one embodiment of the present invention, the transaction handler processes the attachment by converting a file name of the attachment to UTF-8 format for storing in the database. Then the transaction handler terminates.

In step 4203, the transaction handler determines a sender of the TVC request. If the transaction handler determines that the TVC request is received from the TVC client, then the transaction handler proceeds with step 4205. If the transaction handler determines that the TVC request is received from the TVC web interface, then the transaction handler proceeds with step 4206.

In step 4204, the transaction handler processes the volume log as requested in the TVC request for the volume log transaction. The transaction handler creates, updates, or deletes the volume log records in the database. Then the transaction handler proceeds with step 4207.

In step 4205, the transaction handler processes the time log as requested in the TVC request for the time log transaction. The transaction handler creates, updates, or deletes time log records in the database. Through the TVC client, only the end-user is enabled to record time log as the activity is performed by use of time stamps. Then the transaction handler proceeds with step 4206.

In step 4206, the transaction handler consolidates the processed time logs by activity, by end-user, and for a specified period of time. In one embodiment of the present invention, the transaction handler creates a daily, weekly, and/or monthly time log as a result of step 4206 consolidation. Through the TVC web interface, any type of user, either the end-user or the administrator, is enabled to consolidate time logs by activity and by a specific period. Then the transaction handler proceeds with step 4207.

In step 4207, the transaction handler calibrates productive metric figures in the transaction data comprising time logs and volume logs. The TVC server calibrates a respective work standard for each activity in each work-driver, which is predefined in terms of time per unit of business activity. Then the transaction handler terminates.

Figure 4B:
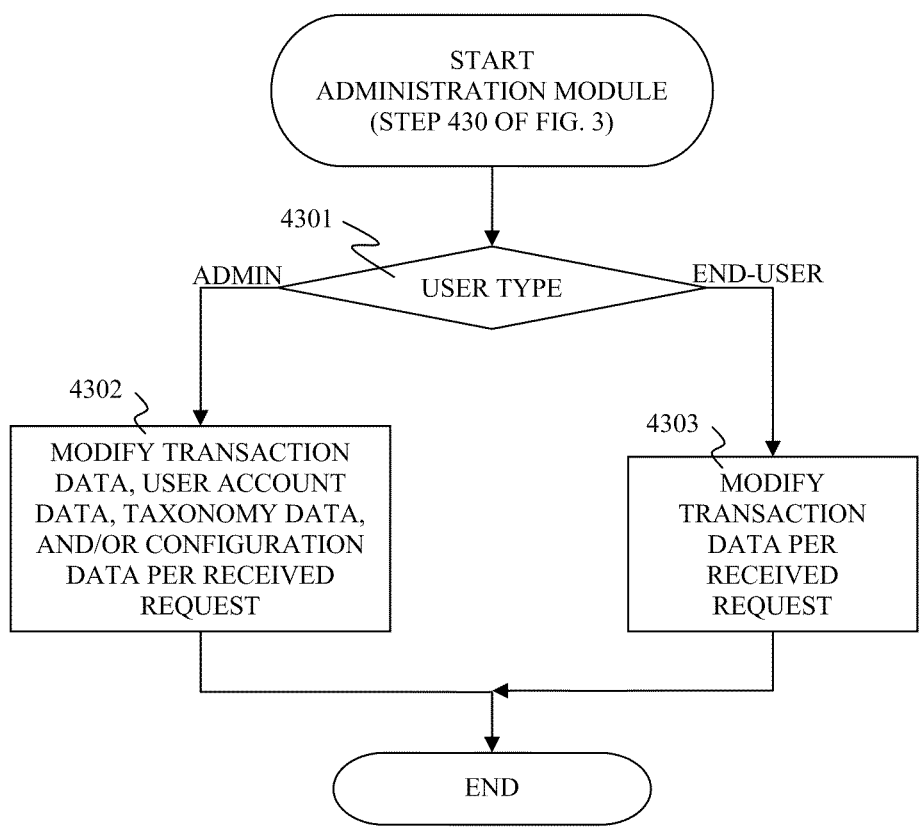
FIG. 4B is a flowchart depicting a method for managing administration records of the database as performed by the administration module of the TVC server of FIG. 1, in accordance with the embodiments of the present invention.

FIG. 4B is a flowchart depicting a method for managing administration records of the database as performed by the administration module of the TVC server of FIG. 1 supra, in accordance with the embodiments of the present invention.

In step 4301, the administration module determines a type of the user who has sent the TVC request. If the administration module determines that an administrator sent the TVC request, then the administration module proceeds with step 4302. If the administration module determines that an end-user sent the TVC request, then the administration module proceeds with step 4303.

In step 4302, the administration module modifies transaction data and administration records comprising user account data, taxonomy data, and/or configuration data according to the received TVC request. The administrator is enabled to activate or deactivate accounts of end-user by modifying the user account data. The administrator is enabled to adjust a TVC hierarchy of activities in the database utilized in the TVC client by modifying the taxonomy data. The administrator is enabled to adjust an interval for data collection from the TVC client and to control versions of the TVC client by modifying the configuration data. Then the administration module terminates.

In step 4303, the administration module modifies transaction data according to the received TVC request. Then the administration module terminates.

Figure 5A:
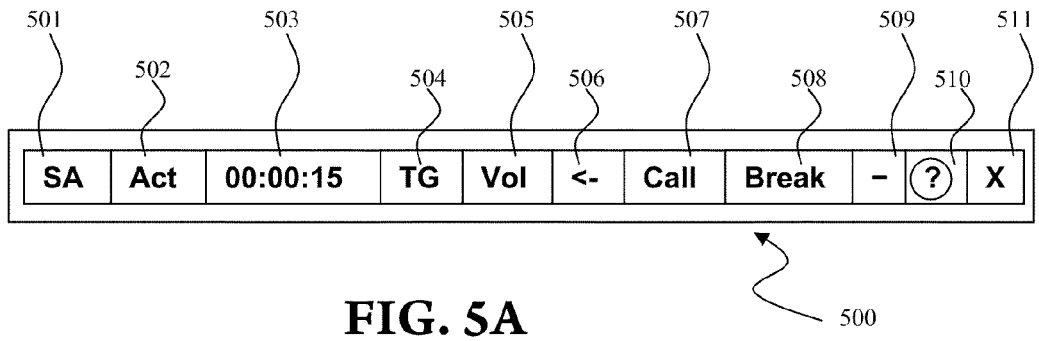
FIGS. 5A and 5B illustrate a menu bar embodiment of the TVC client as displayed on a desktop of the local computer system for an end-user, in accordance with the embodiments of the present invention.
Figure 5B:
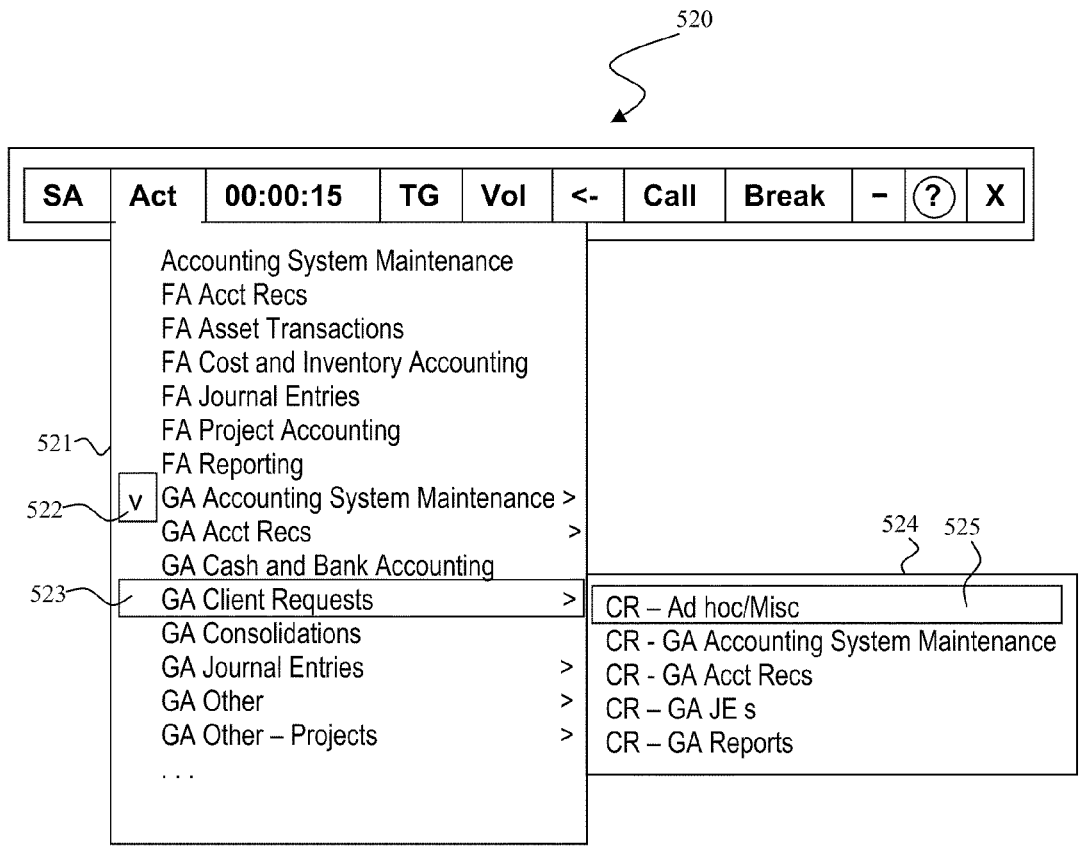

FIGS. 5A and 5B illustrate a menu bar 500 embodiment of the TVC client as displayed on a desktop of the local computer system for an end-user, in accordance with the embodiments of the present invention.

The menu bar 500 is displayed on top of any other application program on a screen such that the TVC client is visible to the user at all time. The user can move around the menu bar 500 to anywhere on the screen, as in ordinary application programs. The menu bar 500 is displayed on various colors based on status of the activity. In one embodiment, the menu bar 500 is displayed in green while the TVC client is processing a predefined core business activity. In the same embodiment, the menu bar 500 is displayed in yellow while the TVC client is processing predefined non-core business activities that are not related to managing and meeting efficiency and/or availability targets. In the same embodiment, the menu bar 500 is displayed in red while the end-user is taking a break.

Some items on the menu bar 500 are buttons associated with a respective functionality that the user can activate by clicking a respective button, as defined in the taxonomy data.

Item SA 501 indicates a service area through which an end-user can use more than one TVC client program at one time to record more than one business process via a respective TVC client program.

Item Act 502 indicates Activity, which is a high level group of activities as defined in the taxonomy data in the database. The end-user selects a transaction from the item Act 502. When the end-user clicks the item Act 502, a drop-down menu 521 opens, which lists high level Activities as defined in the taxonomy data, as shown in FIG. 5B. The activities listed in the drop-down menu 521 may vary from one end-user to another end-user, based on the administration record. When one Activity "GA Client Requests" 523 is selected from the drop-down menu 521, a sub-menu 524 associated with the selected activity 523 subsequently opens, which comprises at least one Timegroup. The end-user selects one Timegroup "CR-Ad hoc/Misc" 525 from the sub-menu 524 to start recording time log of the Timegroup 525. When the end-user selects a new Activity-Timegroup, a dialog box to confirm the selection of new Activity-Timegroup is displayed for the end-user to confirm the selection. As the new selection of the Activity-Timegroup is confirmed, a time log recorded for a previously selected Activity-Timegroup is transferred to the TVC server with the TVC request for a time log transaction.

Item 503 displays duration of time since a current Timegroup has been selected under the dropdown menu 521 from Item Act 502, as shown in items 523 and 525 of FIG. 5B.

Item TG 504 indicates Timegroup, which is a sub-menu of the Activity as defined in the taxonomy data in the database. Activity-Timegroup levels are referred to as a TVC hierarchy defined as the taxonomy data stored in the database. By clicking item TG 504, the end-user inputs comments liked to intervals of time recorded during the day.

Item 505 is a Vol button to record volume logs of the Timegroup transaction selected in the item Act 502, when the Timegroup transaction is completed at points of time when the end-user wishes to record the volume logs, or when a predetermined period according to the configuration of the TVC client.

Item 506 is a backward button that the end-user goes back to a previously selected Activity-Timegroup by clicking the item 506.

Item Call 507 is an interrupt button to pause the time logs when the end-user handles a call or an e-mail while performing a transaction for the selected Activity-Timegroup.

Item Break 508 is a hot key to a Timegroup "Break."

Items 509, 510, and 511 are typical for Windows® application, which indicate to minimize the menu bar 500 of the TVC client, to display TVC help messages, and to close the menu bar 500 of the TVC client program, respectively. (Windows is a registered trademark of Microsoft Corporation in the United States.)

Figure 5C:
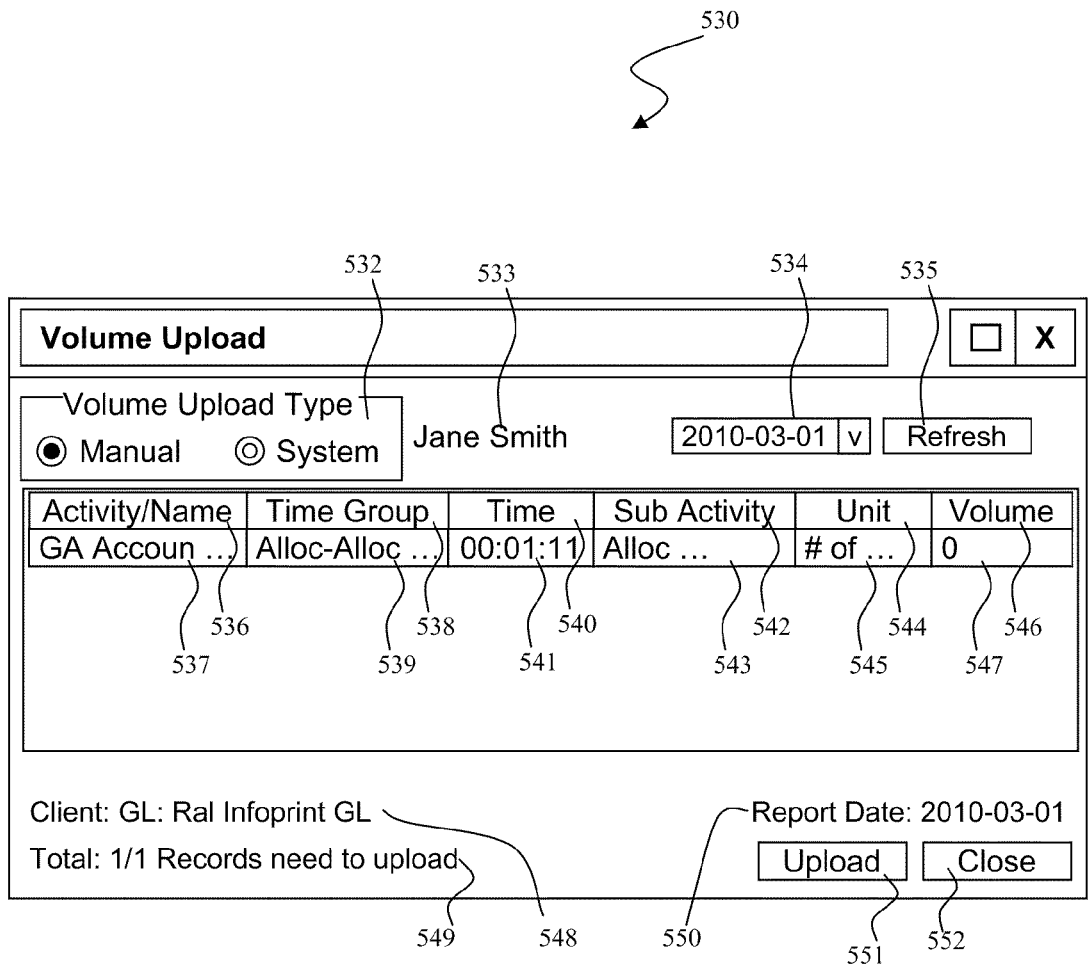
FIG. 5C illustrates a volume upload window launched as the end-user clicks the Vol button of FIG. 5A, in accordance with the embodiments of the present invention.

FIG. 5C illustrates a volume upload window 530 launched as the end-user clicks the Vol button of FIG. 5A supra, in accordance with the embodiments of the present invention.

The end-user launches the volume upload window 530 to upload volume logs of the Activity-Timegroup-Subactivity transaction after recording time logs using the menu bar of FIG. 5A supra. The volume upload type area 532 displays radio buttons for a respective mode of volume upload, wherein "Manual" button indicates that the volume log is manually uploaded by the end-user, and wherein "System" button indicates that the volume log automatically uploaded by the TVC client. The name 533 indicates a name of the end-user who uploads the volume record from the TVC client. The date box 534 indicates a calendar date on which a transaction on the volume upload window 530 is performed. The Refresh button 535 displays transactions of the calendar date for volume uploading.

The end-user uploads volume logs throughout a day, at the end of a work day, or at every predefined period, by entering a proper number in a text box 547 under the Volume heading 546, for a transaction identified in Activity name of text 537, Timegroup name of text 539, and Subactivity name of text 543, under corresponding headings 536, 538, and 542, respectively. The time display 541 under Time heading 540 indicates a time lapse during which the transaction has been performed. The unit of volume 545 under Unit heading 544 is predefined and provided to the end-user on the volume upload window 530 to minimize volume input errors. The end-user modifies volume logs that had been recorded previously within a predefined modification period. In one embodiment of the present invention, the modification period is five (5) days. Text "Client: . . . " 548 indicates a customer for which the transaction is specified. Text "Total: . . . " 549 represents volume uploading status of the transaction. Text "Report Date: . . . " 550 represents a calendar date on which the transaction is reported. Button "Upload" 551 enables the end-user to transfer the input data on the volume upload window 530 to the TVC server to be stored in the database. Button "Close" 552 enables the end-user to close the volume upload window 530.

Figure 5D:
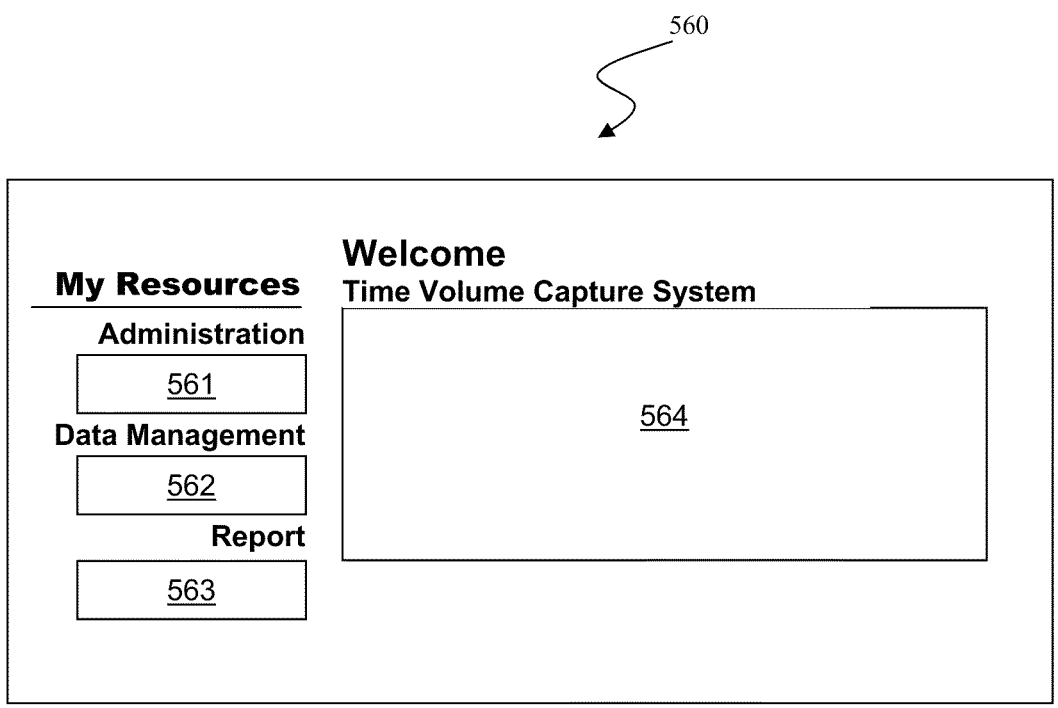
FIG. 5D illustrates a screen display of the TVC web interface, in accordance with the embodiments of the present invention.

FIG. 5D illustrates a screen display 560 of the TVC web interface, in accordance with the embodiments of the present invention.

The end-user and the administrator have a respective view of the TVC web interface and associated functionalities. The screen display 560 comprises administration menu 561, data management menu 562, report menu 563, and a work frame 564.

If the end-user opens the TVC web interface the administration menu 561 comprises "Primary Timegroup" and "Change Password," in which the end-user selects Timegroup used in the TVC client, and changes a password of the end-user, respectively. The data management menu 562 for the end-user comprises "Change Time" and "Change Volume," in which the end-user modifies the time log record and the volume log record in the database, respectively. The report menu 563 for the end-user comprises "Agent Time/Volume Report" and a labor report in which the end-user views a report for time log record and volume log records and a labor report showing hours by Activity and Timegroup, respectively. In this embodiment, the term "agent" is used interchangeably with the term "end-user." The work frame 564 initially displays a welcome message for the end-user, and working items of each menu as the end-user selects and use the functionalities of the TVC web interface.

If the administrator opens the TVC web interface the administration menu 561 comprises "Client," "User," "Tower," "Activity," "Timegroup," "Subactivity," "ILC ABC Mapping," and "Change Password," in which the administrator modifies the TVC taxonomy and account information, time logs and volume logs of end-users, etc. The data management menu 562 for the administrator comprises "Time log," "Change Time," and "Change Volume." The report menu 563 for the administrator comprises "Agent Report," "Agent Time/Volume Report," "Loss Time Report," "Summary Report," "Missing Volume Report," "Dispersion Report," "ILC Report," "Transaction Audit Report," "Taxonomy Audit Report," "Productivity metric report," and "Transaction Audit Summary Report," etc., in which the administrator accesses and creates various kinds of reports. The transaction audit report is a report describing changes made on the transaction data in the database. The taxonomy audit report is a report describing changes made on the taxonomy data in the database. The productivity metric report is a report describing changes made on the work standards for calibration in step 4207 of FIG. 4A supra of the transaction handler. The work frame 564 initially displays a welcome message for the administrator, and working items of each menu as the administrator selects and use the functionalities of the TVC web interface.

FIG. 6A is an example of valid time log stored in the local computer system and transferred to the TVC server at step 260 of FIG. 2A, supra, in accordance with the embodiments of the present invention.

The example in lines L101 to L112, from <timelog> to </timelog>, is a time log file "timelog.xml" that records time logs in Extensible Markup Language (XML) format for an end-user having a value "123813" for attribute agentid. The attribute agentid is an identifier of the account that is used for logging in to the TVC server through either the TVC client or the TVC web interface. The time log file comprises multiple time logs.

Each line <record . . . /> is one instance of a time log record. The time log record comprises attributes date, start, end, timegroupid, clientid, comments, network, CRUD, modified, filename, and attached.

The attribute date indicates a calendar date on which the time log record is created. The attribute start indicates a first time stamp when the time log record begins by the user identified by the identifier agentid. The attribute end indicates a second time stamp when the time log record ends by the user identified by the identifier agentid.

The attribute timegroupid identifies a Timegroup in the taxonomy data of the database that specifies the transaction the user had selected to create the time log record.

The attribute clientid indicates an identifier of a customer for which the transaction is performed. A hierarchy of the taxonomy data in the database is defined for a specific customer, which is represented by the attribute clientid. The user of the TVC system is associated with one or more customer identified by a value of the attribute clientid.

The attribute comments indicates a free flow text comment input by the user of the TVC system for the purpose of reporting and any other additional information.

The attribute network indicates whether the user creates the time log record in on-line mode or in off-line mode, as used in a decision of step 215 of FIG. 2A supra. If a value of the attribute network is "01" as shown in line L102, then the time log record is created in on-line mode. If a value of the attribute network is any value other than "01," then the time log record is created in off-line mode. The values of the attribute network is predefined and stored in the administration records of the database.

The attribute CRUD indicates an operation performed on the time log record. A value "C" of the attribute CRUD indicates that the time log record is being created. A value "U" of the attribute CRUD indicates that the time log record is being updated since values associated with other attributes of the time log record is changed. A value "D" of the attribute CRUD indicates that the time log record is being deleted from the database. Values of the attribute CRUD is used to create a TVC request to the TVC server for an appropriate operation to the time log record in the database.

The attribute modified indicates whether or not the time log record has been modified. A value "T" of the attribute modified indicates that the time log record has been modified. A value "F" of the attribute modified indicates that the time log record has not been modified.

The attribute attached indicates whether or not the transaction with which the time log record is associated has an attachment. A value "T" of the attribute attached indicates that the time log record has an attachment, of which name is specified as a value of the attribute filename. The attachment is processed in step 4202 of FIG. 4A supra by the transaction handler of the TVC server. A value "F" of the attribute attached indicates that the time log record does not have an attachment, which dictates a value of the attribute filename to be null.

FIG. 6B is an example of valid volume log stored in the local computer system and transferred to the TVC server at step 260 of FIG. 2A, supra, in accordance with the embodiments of the present invention.

The example in lines L201 to L204, from <volumelog> to </volumelog>, is a volume log file "volumelog.xml" that records volume logs in Extensible Markup Language (XML) format for an end-user having a value "123813" for attribute agentid. The attribute agentid is an identifier of the account that is used for logging in to the TVC server through either the TVC client or the TVC web interface. The volume log file comprises multiple volume logs.

Each line <record . . . /> is one instance of a volume log record. The volume log record comprises attributes date, subactivityid, volume, clientid, CRUD, and modified.

The attribute date indicates a calendar date on which the volume log record is created.

The attribute subactivityid indicates a lowest level transaction defined in the taxonomy data of the database, which is a component of a higher level transaction Timegroup, wherein the taxonomy data defines a TVC transaction hierarchy as "Activity"—"Timegroup"—"Subactivity."

The attribute volume is a numeric value input by the user for the transaction identified by the value of the attribute subactivityid.

The attribute clientid indicates an identifier of a customer for which the transaction is performed. A hierarchy of the taxonomy data in the database is defined for a specific customer, which is represented by the attribute clientid. The user of the TVC system is associated with one or more customer identified by a value of the attribute clientid.

The attribute CRUD indicates an operation performed on the volume log record. A value "C" of the attribute CRUD indicates that the volume log record is being created. A value "U" of the attribute CRUD indicates that the volume log record is being updated since values associated with other attributes of the volume log record is changed. A value "D" of the attribute CRUD indicates that the volume log record is being deleted from the database. Values of the attribute CRUD is used to create a TVC request to the TVC server for an appropriate operation to the volume log record in the database.

The attribute modified indicates whether or not the volume log record has been modified. A value "T" of the attribute modified indicates that the volume log record has been modified. A value "F" of the attribute modified indicates that the volume log record has not been modified.

FIG. 6C is an example of invalid time log stored in the local computer system at step 270 of FIG. 2A, supra, in accordance with the embodiments of the present invention.

The example in lines L301 to L305, from <timelog> to </timelog>, is a time log file "timelogexceed.xml" that records invalid time logs in Extensible Markup Language (XML) format for an end-user having a value "123813" for attribute agentid. The attribute agentid is an identifier of the account that is used for logging in to the TVC server through either the TVC client or the TVC web interface. The time log file comprises multiple time logs. See descriptions of FIG. 6A supra for details of each attribute in the records of lines L302 to L304. The time log file is invalid because a record of line L303 and a record of line L304 have overlapping start time and end time.

Figure 7:
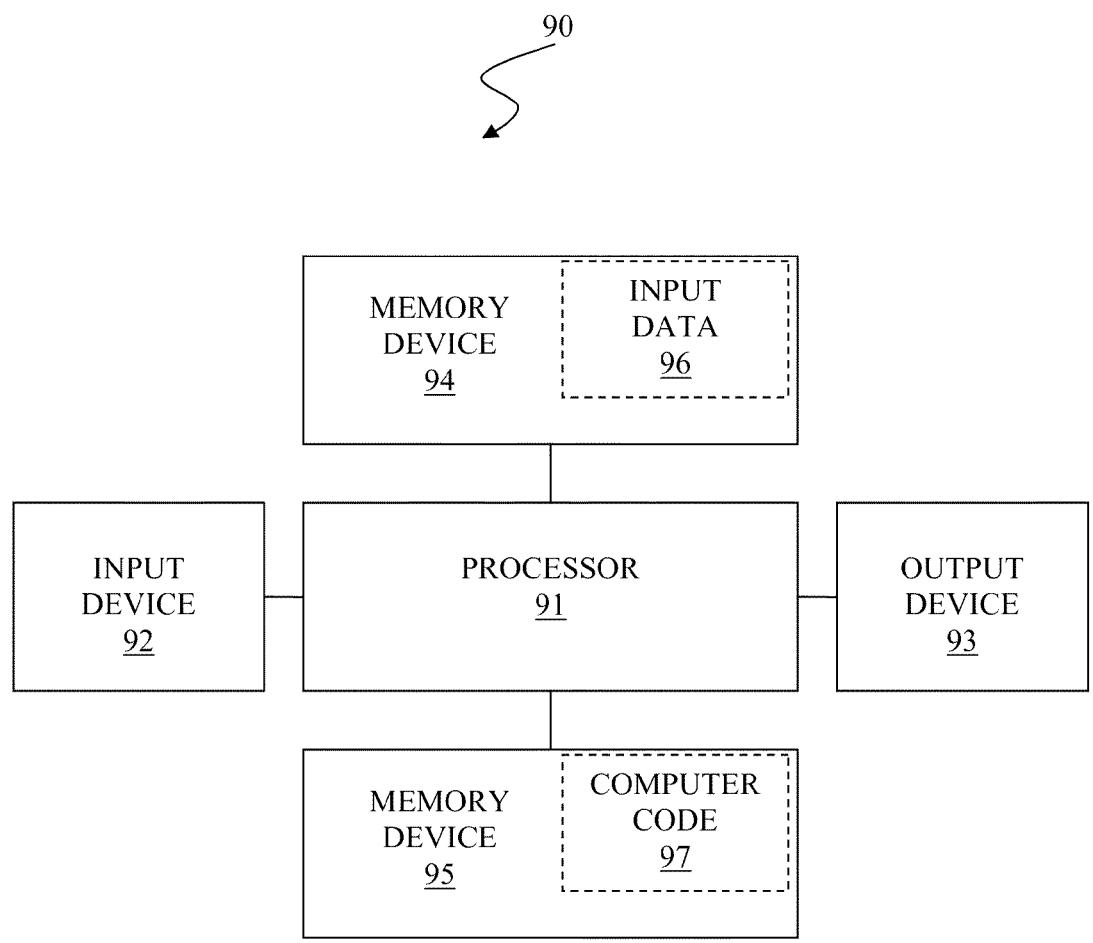
FIG. 7 illustrates a computer system used for monitoring and reporting productivity in an enterprise environment, in accordance with the embodiments of the present invention.

FIG. 7 illustrates a computer system used for monitoring and reporting productivity in an enterprise environment, in accordance with the embodiments of the present invention.

The computer system 90 comprises a processor 91, an input device 92 coupled to the processor 91, an output device 93 coupled to the processor 91, and computer readable memory units comprising memory devices 94 and 95 each coupled to the processor 91. The input device 92 may be, inter alia, a keyboard, a mouse, a keypad, a touch screen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program code that comprises computer-executable instructions. The computer code 97 includes, inter alia, an algorithm used for monitoring and reporting productivity in an enterprise environment according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may be used as a computer readable storage medium (or a computer usable storage medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer readable storage medium (or said program storage device).

Any of the components of the present invention can be deployed, managed, serviced, etc. by a service provider that offers to deploy or integrate computing infrastructure with respect to a process for dynamically building a web interface per data collecting rules of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for monitoring and reporting productivity in an enterprise environment.

In another embodiment, the invention provides a business method that performs the process steps of the invention on a subscription, advertising and/or fee basis. That is, a service provider, such as a Solution Integrator, can offer to create, maintain, support, etc. a process for monitoring and reporting productivity in an enterprise environment of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) 94, 95 may be utilized. The term computer usable medium or computer readable medium collectively refers to computer usable/readable storage medium 94, 95. The computer-usable or computer-readable medium 94, 95 may be, for example but not limited to, an electronic, magnetic, optical, electromagnetic, or semiconductor system, apparatus, a device, or any suitable combination of the foregoing. More specific examples (a non-exhaustive list) of the computer-readable medium 94, 95 would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-usable or computer-readable medium 94, 95 could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium 94, 95 may be any medium that can contain, or store a program for use by or in connection with a system, apparatus, or device that executes instructions.

Computer code 97 for carrying out operations of the present invention may be written in any combination of one or more programming languages, including an object oriented programming language such as Java, Smalltalk, C++ or the like and conventional procedural programming languages, such as the "C" programming language or similar programming languages. The computer code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer code 97" in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in the computer-readable medium 94, 95 that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for monitoring and reporting productivity in an enterprise environment, said method comprising:
   a processor of a transaction handler/administration module receiving a first request from a first user to modify a database coupled to a server computer,
   wherein the database comprises transaction data and administration data,
   wherein the transaction data and the administration data are collected from administrative users and end users by a client program at a frequency defined by a predetermined data-collection interval,
   wherein the transaction data comprises a time log of a set of transactions performed by end users of the client program and a volume log of the set of transactions,
   wherein each entry of the time log of the transaction data identifies an action to be performed upon the database, where the action is selected from the group comprising: create a new time record in the database, delete an existing time record from the database, and update an existing time record in the database,
   wherein each entry of the volume log of the transaction data identifies an action to be performed upon the database, where the action is selected from the group comprising: create a new volume record in the database, delete an existing volume record from the database, and update an existing volume record in the database, and
wherein the administration data configures operations of the client program per transaction;

the processor determining that the first user is not currently online;

the processor further determining that the time log comprises information recorded into the time log by the first user during a time when the first user was not online;

the processor, in response to the determining that the first user is not currently online and that the time log comprises information recorded into the time log by the first user during a time when the first user was not online, timestamping an entry of the volume log that records an activity performed by the first user while the first user was online;

the processor, in further response to the determining that the first user is not currently online and that the time log comprises information recorded into the time log by the first user while the first user was not online, identifying that the timestamped volume log comprises two or more entries that each identify a period of time associated with a corresponding transaction, and where the identified periods of time overlap;

the processor, in response to the identifying, storing the timestamped volume log in a file system that is local to the client program;

the processor further determining whether the first user is an administrative user or an end-user;

the processor, if determining that the first user is an administrative user, adjusting a duration of the data-collection interval;

the processor, if determining that the first user is an end-user, notifying a report module that the first user is an end-user, wherein the report module is distinct from the transaction handler/administration module; and the report module, if receiving notice that the first user is an end-user, generating a report that characterizes an activity of the first user that is identified by the time log and by the volume log,
wherein the characterizing comprises reporting a calibrated utilization value CU, such that:
$U=T^2/(H \times S)$, wherein T=an amount of time that the first user spends on the activity, S=a work standard against which is compared the amount of time that the first user spends on the activity, and H=a time period during which the first user was expected to be available to work on the activity, and
the calibrated utilization value CU is computed by multiplying the value of U by a constant value of 10,000.

2. The method of claim 1, further comprising:
the processor receiving a second request from a second user to modify the database
the processor determining a type of the second request as a transaction request, wherein the second request requests a second transaction;
the processor determining that the second user is an end-user and is currently online;
the processor detecting whether the second request is submitted through the client program or a Web interface, wherein the Web interface is configured to manage the database;
the processor processing the second request as a function of whether a type of the second request is a management request or is a transaction request that was submitted through the web interface, wherein the processor sets the type of the second request to be a transaction request if the second request was submitted by the client program instead of through the web interface; and
the processor generating at least one report comprising the calibrated productivity metric figures of the second transaction.

3. The method of claim 2, further comprising:
said processor determining the type of the received request as the transaction request;
said processor determining a type of a transaction requested by the transaction request as an attachment transaction;
said processor processing a file attachment of the attachment transaction and store the file attachment in a file system of the server computer.

4. The method of claim 2, said processing further comprising:
said processor determining the type of the received request as the transaction request;
said processor determining a type of a transaction requested by the transaction request as a time log transaction; and
said processor processing the time log of the transaction data upon determining that the sender is the client program, wherein the processing the time log comprises calibrating the respective work standard S as a function of information contained in the time log.

5. The method of claim 2, further comprising:
said processor determining the type of the received request as the transaction request;
said processor determining a type of a transaction requested by the transaction request as a time log transaction; and
said processor consolidating the time log of the transaction data with other time logs associated with the time log according to activity of the transaction data upon determining that the sender is the web interface.

6. The method of claim 2, further comprising:
said processor determining the type of the received request as the transaction request;
said processor determining a type of a transaction requested by the transaction request as a volume log transaction; and
said processor processing the volume log of the transaction data.

7. A computer program product comprising:
a computer-readable hardware storage device having a computer-readable program code stored therein, said program code configured to be executed by a processor of a transaction handler/administration module to implement a method for monitoring and reporting productivity in an enterprise environment, said method comprising:
the processor receiving a first request from a first user to modify a database coupled to a server computer,
wherein the database comprises transaction data and administration data,
wherein the transaction data and the administration data are collected from administrative users and end users by a client program at a frequency defined by a predetermined data-collection interval,
wherein the transaction data comprises a time log of a set of transactions performed by end users of the client program and a volume log of the set of transactions, wherein each entry of the time log of the transaction data identifies an action to be performed upon the database, where the action is selected from the group comprising: create a new time record in the database, delete an existing time record from the database, and update an existing time record in the database, wherein each entry of the volume log of the transaction data identifies an action to be performed upon the database, where the action is selected from the group comprising: create a new volume record in the database, delete an existing volume record from the database, and update an existing volume record in the database, and wherein the administration data configures operations of the client program per transaction;

the processor determining that the first user is not currently online;

the processor further determining that the time log comprises information recorded into the time log by the first user during a time when the first user was not online;

the processor, in response to the determining that the first user is not currently online and that the time log comprises information recorded into the time log by the first user during a time when the first user was not online, timestamping an entry of the volume log that records an activity performed by the first user while the first user was online;

the processor, in further response to the determining that the first user is not currently online and that the time log comprises information recorded into the time log by the first user while the first user was not online, identifying that the timestamped volume log comprises two or more entries that each identify a period of time associated with a corresponding transaction, and where the identified periods of time overlap;

the processor, in response to the identifying, storing the timestamped volume log in a file system that is local to the client program;

the processor further determining whether the first user is an administrative user or an end-user;

the processor, if determining that the first user is an administrative user, adjusting a duration of the data-collection interval;

the processor, if determining that the first user is an end-user, notifying a report module that the first user is an end-user, wherein the report module is distinct from the transaction handler/administration module; and the report module, if receiving notice that the first user is an end-user, generating a report that characterizes an activity of the first user that is identified by the time log and by the volume log, wherein the characterizing comprises reporting a calibrated utilization value CU, such that:

$U=T^2/(H \times S)$, wherein T=an amount of time that the first user spends on the activity, S=a work standard against which is compared the amount of time that the first user spends on the activity, and H=a time period during which the first user was expected to be available to work on the activity, and the calibrated utilization value CU is computed by multiplying the value of U by a constant value of 10,000.

8. The computer program product of claim 7, further comprising:

the processor receiving a second request from a second user to modify the database the processor determining a type of the second request as a transaction request, wherein the second request requests a second transaction;

the processor determining that the second user is an end-user and is currently online;

the processor detecting whether the second request is submitted through the client program or a Web interface, wherein the Web interface is configured to manage the database;

the processor processing the second request as a function of whether a type of the second request is a management request or is a transaction request that was submitted through the web interface, wherein the processor sets the type of the second request to be a transaction request if the second request was submitted by the client program instead of through the web interface; and the processor generating at least one report comprising the calibrated productivity metric figures of the second transaction.

9. The computer program product of claim 8, said processing further comprising:

said processor determining the type of the received request as the transaction request;

said processor determining a type of a transaction requested by the transaction request as an attachment transaction;

said processor processing a file attachment of the attachment transaction and store the file attachment in a file system of the server computer.

10. The computer program product of claim 8, said processing further comprising:

said processor determining the type of the received request as the transaction request;

said processor determining a type of a transaction requested by the transaction request as a time log transaction; and said processor processing the time log of the transaction data upon determining that the sender is the client program, wherein the processing the time log comprises calibrating the respective work standard S as a function of information contained in the time log.

11. The computer program product of claim 8, said processing further comprising:

said processor determining the type of the received request as the transaction request;

said processor determining a type of a transaction requested by the transaction request as a time log transaction; and said processor consolidating the time log of the transaction data with other time logs associated with the time log according to activity of the transaction data upon determining that the sender is the web interface.

12. The computer program product of claim 8, said processing further comprising:

said processor determining the type of the received request as the transaction request;

said processor determining a type of a transaction requested by the transaction request as a volume log transaction; and said processor processing the volume log of the transaction data.

13. A computer system comprising a processor of a transaction handler/administration module, a memory coupled to the processor, and a computer-readable hardware storage device coupled to said processor, said storage device containing program code configured to be run by the processor via the memory to implement a method for monitoring and reporting productivity in an enterprise environment, said method comprising:

the processor receiving a first request from a first user to modify a database coupled to a server computer,
wherein the database comprises transaction data and administration data,
wherein the transaction data and the administration data are collected from administrative users and end users by a client program at a frequency defined by a predetermined data-collection interval,
wherein the transaction data comprises a time log of a set of transactions performed by end users of the client program and a volume log of the set of transactions,
wherein each entry of the time log of the transaction data identifies an action to be performed upon the database, where the action is selected from the group comprising: create a new time record in the database, delete an existing time record from the database, and update an existing time record in the database,
wherein each entry of the volume log of the transaction data identifies an action to be performed upon the database, where the action is selected from the group comprising: create a new volume record in the database, delete an existing volume record from the database, and update an existing volume record in the database, and
wherein the administration data configures operations of the client program per transaction;
the processor determining that the first user is not currently online;
the processor further determining that the time log comprises information recorded into the time log by the first user during a time when the first user was not online;
the processor, in response to the determining that the first user is not currently online and that the time log comprises information recorded into the time log by the first user during a time when the first user was not online, timestamping an entry of the volume log that records an activity performed by the first user while the first user was online;
the processor, in further response to the determining that the first user is not currently online and that the time log comprises information recorded into the time log by the first user while the first user was not online, identifying that the timestamped volume log comprises two or more entries that each identify a period of time associated with a corresponding transaction, and where the identified periods of time overlap;
the processor, in response to the identifying, storing the timestamped volume log in a file system that is local to the client program;
the processor further determining whether the first user is an administrative user or an end-user;
the processor, if determining that the first user is an administrative user, adjusting a duration of the data-collection interval;
the processor, if determining that the first user is an end-user, notifying a report module that the first user is an end-user, wherein the report module is distinct from the transaction handler/administration module; and
the report module, if receiving notice that the first user is an end-user, generating a report that characterizes an activity of the first user that is identified by the time log and by the volume log,
wherein the characterizing comprises reporting a calibrated utilization value CU, such that:
$U=T^2/(H \times S)$, wherein T=an amount of time that the first user spends on the activity, S=a work standard against which is compared the amount of time that the first user spends on the activity, and H=a time period during which the first user was expected to be available to work on the activity, and
the calibrated utilization value CU is computed by multiplying the value of U by a constant value of 10,000.

14. The system of claim 13, further comprising:
the processor receiving a second request from a second user to modify the database
the processor determining a type of the second request as a transaction request, wherein the second request requests a second transaction;
the processor determining that the second user is an end-user and is currently online;
the processor detecting whether the second request is submitted through the client program or a Web interface, wherein the Web interface is configured to manage the database;
the processor processing the second request as a function of whether a type of the second request is a management request or is a transaction request that was submitted through the web interface, wherein the processor sets the type of the second request to be a transaction request if the second request was submitted by the client program instead of through the web interface; and
the processor generating at least one report comprising the calibrated productivity metric figures of the second transaction.

15. The system of claim 14, said processing further comprising:
said processor determining the type of the received request as the transaction request;
said processor determining a type of a transaction requested by the transaction request as an attachment transaction;
said processor processing a file attachment of the attachment transaction and store the file attachment in a file system of the server computer.

16. The system of claim 14, said processing further comprising:
said processor determining the type of the received request as the transaction request;
said processor determining a type of a transaction requested by the transaction request as a time log transaction; and
said processor processing the time log of the transaction data upon determining that the sender is the client program, wherein the processing the time log comprises calibrating the respective work standard S as a function of information contained in the time log.

17. The system of claim 14, said processing further comprising:
said processor determining the type of the received request as the transaction request;
said processor determining a type of a transaction requested by the transaction request as a time log transaction; and
said processor consolidating the time log of the transaction data with other time logs associated with the time log according to activity of the transaction data upon determining that the sender is the web interface.

18. The system of claim 14, said processing further comprising:
- said processor determining the type of the received request as the transaction request;
- said processor determining a type of a transaction requested by the transaction request as a volume log transaction; and
- said processor processing the volume log of the transaction data.

* * * * *